US010480612B2

(12) United States Patent
Liu et al.

(10) Patent No.: US 10,480,612 B2
(45) Date of Patent: *Nov. 19, 2019

(54) DAMPING DEVICE AND VEHICLE-MOUNTED GIMBAL USING THE SAME

(71) Applicant: SZ DJI OSMO TECHNOLOGY CO., LTD., Shenzhen (CN)

(72) Inventors: Hao Liu, Shenzhen (CN); Paul Pan, Shenzhen (CN); Li Zhou, Shenzhen (CN); Yanchong Zhao, Shenzhen (CN); Baolu Meng, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,818

(22) Filed: Jan. 24, 2019

(65) Prior Publication Data

US 2019/0154109 A1 May 23, 2019

Related U.S. Application Data

(63) Continuation of application No. 15/604,779, filed on May 25, 2017, now Pat. No. 10,197,130, which is a
(Continued)

(51) Int. Cl.
*F16M 13/00* (2006.01)
*F16F 15/04* (2006.01)
(Continued)

(52) U.S. Cl.
CPC .............. *F16F 15/04* (2013.01); *B60R 11/04* (2013.01); *F16M 11/00* (2013.01);
(Continued)

(58) Field of Classification Search
CPC .......... F16F 15/04; F16M 11/22; B60R 11/04; G03B 17/561
(Continued)

(56) References Cited

U.S. PATENT DOCUMENTS

| 10,072,789 B2* | 9/2018 | Pan .................... F16M 11/18 |
| 10,073,326 B2* | 9/2018 | Zhou .................. F16M 13/04 |
| 10,197,130 B2* | 2/2019 | Liu ..................... B60R 11/04 |

FOREIGN PATENT DOCUMENTS

| CN | 201802807 U | 4/2011 |
| CN | 201971165 U | 9/2011 |

(Continued)

OTHER PUBLICATIONS

The World Intellectual Property Organization (WIPO) International Search Report for PCT/CN2014/092410 dated Aug. 21, 2015 6 Pages.

*Primary Examiner* — Todd M Epps
(74) *Attorney, Agent, or Firm* — Anova Law Group, PLLC

(57) ABSTRACT

A vehicle-mounted gimbal system includes a damping device and a gimbal configured to be mounted on a hanging component of a vehicle through the damping device. The damping device includes a first damping connecting member, a second damping connecting member opposite to and spaced apart from the first damping connecting member, and a steel wire rope damper. Two ends of the steel wire rope damper are connected with the first damping connecting member and the second damping connecting member, respectively.

20 Claims, 16 Drawing Sheets

Related U.S. Application Data continuation of application No. PCT/CN2014/092410, filed on Nov. 28, 2014.

(51) Int. Cl.

| | | |
|---|---|---|
| *B60R 11/04* | (2006.01) | |
| *F16M 11/00* | (2006.01) | |
| *F16M 11/22* | (2006.01) | |
| *G03B 17/56* | (2006.01) | |
| *F16M 11/04* | (2006.01) | |
| *F16M 11/12* | (2006.01) | |
| *F16M 11/20* | (2006.01) | |
| *F16M 11/24* | (2006.01) | |
| *F16M 13/02* | (2006.01) | |

(52) U.S. Cl.
CPC ......... *F16M 11/041* (2013.01); *F16M 11/123* (2013.01); *F16M 11/2035* (2013.01); *F16M 11/2085* (2013.01); *F16M 11/2092* (2013.01); *F16M 11/22* (2013.01); *F16M 11/24* (2013.01); *F16M 13/02* (2013.01); *G03B 17/561* (2013.01); *F16M 2200/044* (2013.01)

(58) Field of Classification Search
USPC .......................................... 248/618; 396/418
See application file for complete search history.

(56) References Cited

FOREIGN PATENT DOCUMENTS

| | | |
|---|---|---|
| CN | 202939404 U | 5/2013 |
| CN | 103754377 A | 4/2014 |
| CN | 203558203 U | 4/2014 |
| CN | 203819498 U | 9/2014 |
| CN | 104132226 A | 11/2014 |
| CN | 203963419 U | 11/2014 |
| CN | 204358016 U | 5/2015 |
| JP | H10196713 A | 7/1998 |
| JP | 2001124143 A | 5/2001 |
| JP | 2006161985 A | 6/2006 |
| JP | 2008263514 A | 10/2008 |
| JP | 3169716 U | 8/2011 |
| JP | 2011220440 A | 11/2011 |
| KR | 20140004877 U | 9/2014 |

\* cited by examiner

DAMPING DEVICE AND VEHICLE-MOUNTED GIMBAL USING THE SAME

CROSS-REFERENCE TO RELATED APPLICATION

This application is a continuation application of U.S. application Ser. No. 15/604,779, filed on May 25, 2017, which is a continuation application of International Application No. PCT/CN2014/092410, filed on Nov. 28, 2014, the entire contents of both of which are incorporated herein by reference.

TECHNICAL FIELD

The present disclosure relates to a damping device of a gimbal, and in particular, to a damping device and a vehicle-mounted gimbal using the damping device.

BACKGROUND

The traditional photographic equipment, when photographing during high-speed travel of a vehicle, cannot eliminate an image jitter problem in the process of movement of the vehicle. By use of this damping device, the photographic equipment can still produce stable and clear pictures in the event of high-speed movement, which effectively mitigates influences brought about to a shooting effect by various vibrations in the process of movement of the vehicle.

Owing to differences among factors such as a wide variety of vehicle models, different vehicle conditions and road surfaces, it is difficult for the traditional gimbal damping device to weaken influences brought about to the gimbal by vehicle vibration to a greater extent to reduce a vibration frequency and achieve a good shooting effect.

SUMMARY

In view of the above, the present disclosure provides a damping device with a better damping effect.

In accordance with the disclosure, there is provided a damping device including an upper damping connecting member, a lower damping connecting member opposite to and spaced apart from the upper damping connecting member, a steel wire rope damper disposed between the upper damping connecting member and the lower damping connecting member, and a carrying damper connected with the upper damping connecting member. Two ends of the steel wire rope damper are connected with the upper damping connecting member and the lower damping connecting member, respectively.

The aforementioned damping device is connected between the upper damping connecting member and the lower damping connecting member by using a steel wire rope damper, and as the steel wire rope damper has characteristics of nonlinear stiffness and nonlinear damping and has advantages such as strong environment adaptability, a long service life, diversified mounting manners, good buffering and anti-shock performance, great damping, and convenient mounting, the aforementioned damping device exhibits good performance in different vibration situations, effectively mitigating influences brought about to the gimbal by external vibration, thus reducing a vibration frequency to achieve a better damping effect.

Also in accordance with the disclosure, there is provided a vehicle-mounted gimbal system including the damping device described above and a gimbal fixedly connected with the lower damping connecting member. The upper damping connecting member is configured to be connected with a vehicle-mounted hanging component and the gimbal is configured to be mounted on the vehicle-mounted hanging component through the damping device.

DETAILED DESCRIPTION OF THE EMBODIMENTS

Figure 1:
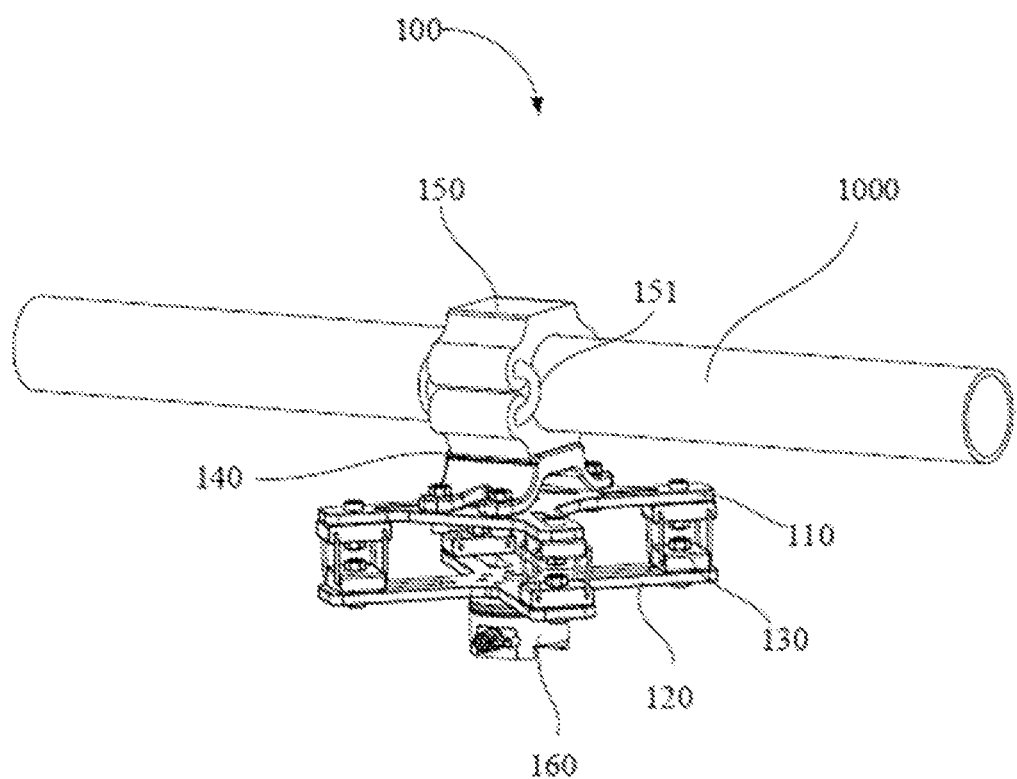
FIG. 1 is a perspective view of a damping device according to a first implementation manner of the present disclosure.

Technical solutions of the present disclosure will be described with reference to the drawings. It will be appreciated that embodiments as described in the disclosure are some rather than all of the embodiments of the present disclosure. Other embodiments, which are conceived by those having ordinary skills in the art on the basis of the disclosed embodiments without inventive efforts, should fall within the scope of the present disclosure.

It should be noted that when an assembly is referred to as "be fixed to" another assembly, it may be directly on the another assembly or it is also possible that there is an assembly between them. When one assembly is considered to "connect" another assembly, it may be directly connected to the another assembly or it is also possible that there is an assembly between them. The terms "perpendicular," "horizontal," "left," "right," and similar expressions used herein are merely intended for description.

Unless otherwise defined, all the technical and scientific terms used herein are the same as the meanings generally understood by persons skilled in the technical field of the present disclosure. Herein, the terms used in the specification of the present disclosure are only intended to describe specific embodiments, instead of limiting the present disclosure. The term "and/or" used herein includes any combination and all combinations of one or more related items listed.

In an implementation manner of the present disclosure, a damping device for a gimbal is provided for damping vibration of the gimbal by using a steel wire rope damper. For example, the damping device includes an upper damping connecting member, a lower damping connecting member opposite to and spaced apart from the upper damping connecting member, and a steel wire rope damper disposed between the upper damping connecting member and the lower damping connecting member. Two ends of the steel wire rope damper are connected with the upper damping connecting member and the lower damping connecting member respectively.

A steel wire rope damper has characteristics of nonlinear stiffness and nonlinear damping. As compared with conventional rubber dampers, a steel wire rope damper has advantages such as strong environment adaptability, a long service life, diversified mounting manners, good buffering and anti-shock performance, great damping, and convenient mounting. Thus, the aforementioned damping device exhibits good performance in different vibration situations, and a good shooting can be achieved by effectively mitigating influences brought about to the gimbal by external vibration to reduce a vibration frequency.

In an implementation manner of the present disclosure, another damping device for a gimbal is provided for damping vibration of the gimbal by using a composite damper including a one-dimensional damper and a three-dimensional damper. For example, the composite damper includes a gimbal damper used to be fixedly connected with the gimbal and a carrying damper fixedly connected with the gimbal damper. The gimbal damper is a three-dimensional damper that damps vibration in a three-dimensional space, and the carrying damper is a one-dimensional damper that damps vibration along a one-dimensional straight line. External vibration is transferred from the carrying damper to the gimbal damper, and then transferred to the gimbal through the gimbal damper.

The composite damper uses a one-dimensional damper and a three-dimensional damper to damp vibration jointly. The one-dimensional damper can concentrate on damping in a direction in which the vibration is more intense, so as to produce a good damping effect while keeping the cost relatively low.

Based on the aforementioned damping device, in an implementation manner of the present disclosure, a vehicle-mounted gimbal using the damping device is further provided. The vehicle-mounted gimbal includes the damping device and a gimbal connected with a vehicle-mounted hanging component through the damping device. The vibration produced by a vehicle is transferred from the vehicle-mounted hanging component to the damping device and, after passing through the damping device, is then transferred to the gimbal, so as to effectively damp vibration of the gimbal.

It should be noted that the aforementioned damping devices are not limited to being adapted to a vehicle-mounted gimbal, and may also be adapted to other gimbals, for example, handheld gimbals.

Certain implementation manners of the present disclosure are described below in detail with reference to the accompanying drawings.

Referring to FIG. 1, a damping device 100 according to a first implementation manner of the present disclosure includes an upper damping connecting member 110, a lower damping connecting member 120, and a steel wire rope damper 130. The lower damping connecting member 120 is opposite to and spaced apart from the upper damping connecting member 110. The steel wire rope damper 130 is disposed between the upper damping connecting member 110 and the lower damping connecting member 120, and two ends of the steel wire rope damper 130 are connected with the upper damping connecting member 110 and the lower damping connecting member 120 respectively.

Figure 2:
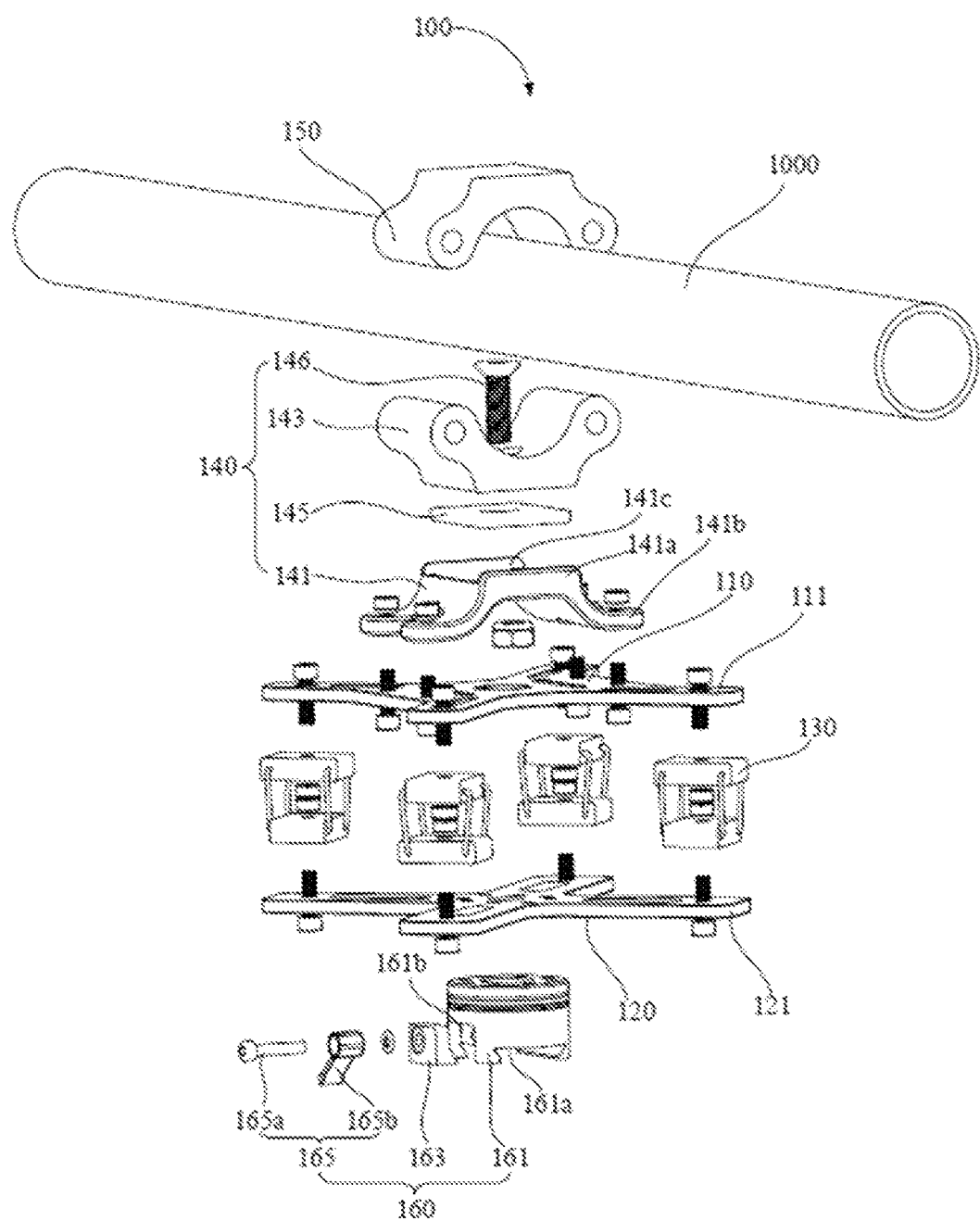
FIG. 2 is an exploded view of the damping device shown in FIG. 1.

Referring to FIG. 2, the upper damping connecting member 110 includes a plurality of upper connecting portions 111 used to connect the steel wire rope dampers 130. In some embodiments, the plurality of upper connecting portions 111 are distributed in central symmetry or axial symmetry.

The specific structure of the upper damping connecting member 110 may be designed in accordance with different demands. For example, in the embodiment illustrated, the upper damping connecting member 110 includes a cross-shaped plate, and four end portions of the plate are the upper connecting portions 111.

In other embodiments, the upper damping connecting member 110 includes a circular plate, and a plurality of upper connecting portions 111 are disposed at a peripheral edge of the plate respectively and are evenly spaced.

The lower damping connecting member 120 includes a plurality of lower connecting portions 121 used to connect the steel wire rope damper 130. In some embodiments, the plurality of lower connecting portions 121 are distributed in central symmetry or axial symmetry.

The specific structure of the lower damping connecting member 120 may be designed in accordance with different demands. For example, in the embodiment illustrated, the lower damping connecting member 120 includes a cross-shaped plate, and four end portions of the plate are the lower connecting portions 121.

In other embodiments, the lower damping connecting member 120 includes a circular plate, and the plurality of lower connecting portions 121 are disposed at a peripheral edge of the plate respectively and are evenly spaced.

The steel wire rope damper 130 may be a one-dimensional damper that damps vibration along a one-dimensional straight line, a two-dimensional damper that damps vibration in a two-dimensional plane, or a three-dimensional damper that damps vibration in a three-dimensional space. Specifically, in the embodiment illustrated, the steel wire rope damper 130 is a three-dimensional damper that damps vibration in a three-dimensional space.

Figure 3:
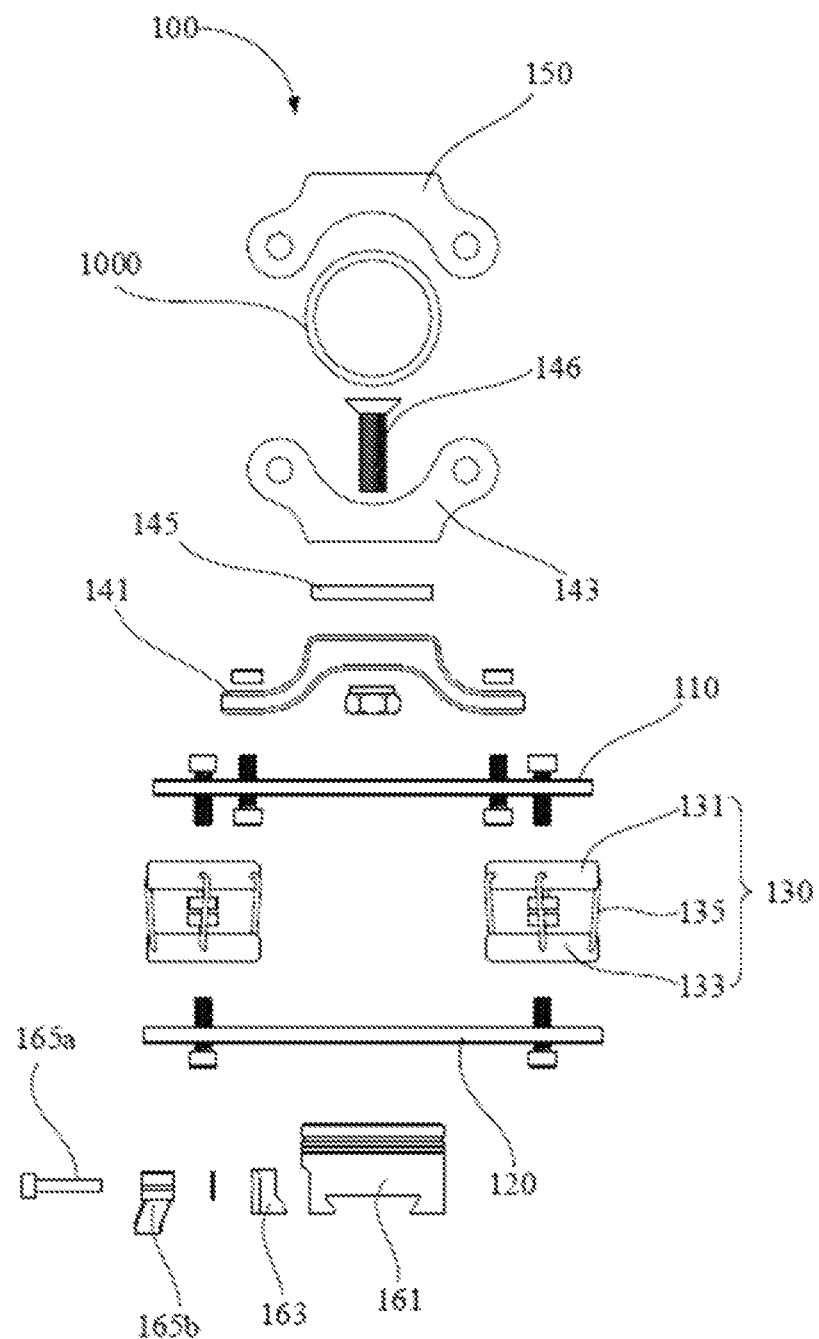
FIG. 3 is an exploded view of the damping device shown in FIG. 1 from another perspective.
Figure 4:
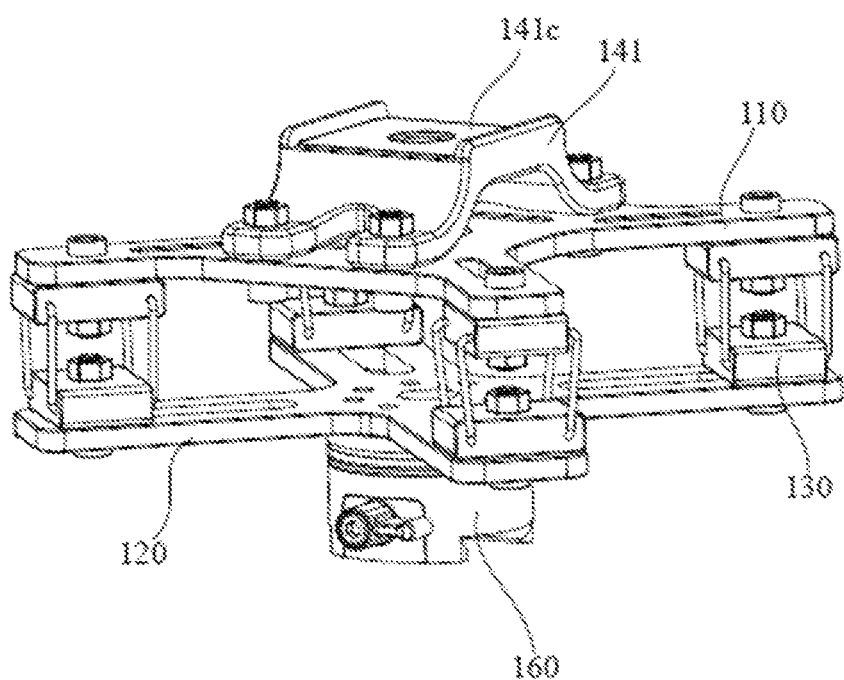
FIG. 4 is a local perspective view of the damping device shown in FIG. 1.
Figure 5:
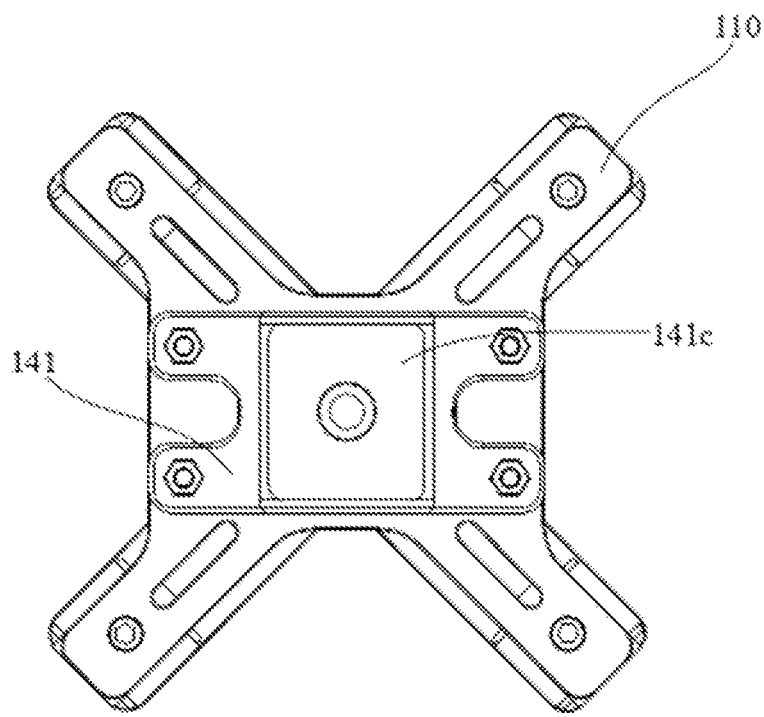
FIG. 5 is a top view of the damping device shown in FIG. 4.
Figure 6:
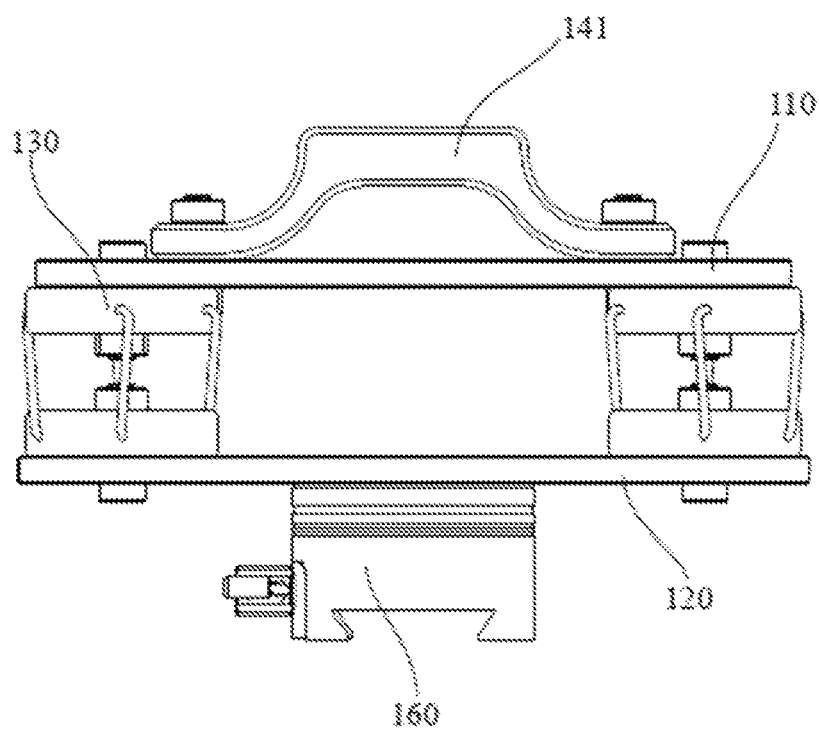
FIG. 6 is a side view of the damping device shown in FIG. 4.
Figure 7:
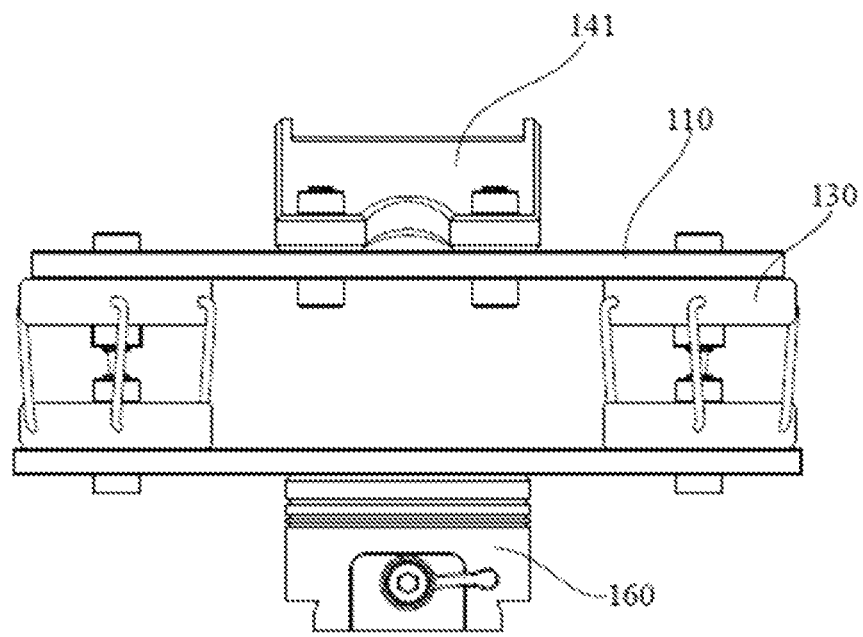
FIG. 7 is a side view of the damping device shown in FIG. 4 from another perspective.

The specific structure of the steel wire rope damper 130 may be designed in accordance with different demands. For example, as shown in FIG. 3, in the embodiment illustrated, the steel wire rope damper 130 includes an upper connecting member 131, a lower connecting member 133 and a steel wire rope 135. The upper connecting member 131 is used to be fixedly connected with the upper damping connecting member 110. The lower connecting member 133 is used to be fixedly connected with the lower damping connecting member 120 to be opposite to and spaced apart from the upper connecting member 131. The steel wire rope 135 connects the upper connecting member 131 and the lower connecting member 133.

A manner in which the steel wire rope damper 130 is connected with the upper damping connecting member 110 may also be designed in accordance with different demands. For example, in the embodiment illustrated, an upper connecting portion 111 is fixedly connected with the steel wire rope damper 130 through an upper connecting shaft. The upper connecting shaft is disposed in parallel to elastic portions of the steel wire rope 135 exposed between the upper connecting member 131 and the lower connecting member 133.

Specifically, the upper connecting shaft may be a screw. The upper connecting shaft passes through the upper connecting portion 111 of the upper damping connecting member 110 and the upper connecting member 131 to engage with a nut by screwing to fixedly connect the upper damping connecting member 110 to the upper connecting member 131 of the steel wire rope damper 130.

A manner in which the steel wire rope damper 130 is connected to the lower damping connecting member 120 may also be designed in accordance with different demands. For example, in the embodiment illustrated, a lower connecting portion 121 is fixedly connected with the steel wire rope damper 130 through a lower connecting shaft. The lower connecting shaft is disposed in parallel to elastic portions of the steel wire rope 135 exposed between the upper connecting member 131 and the lower connecting member 133.

Specifically, the lower connecting shaft may be a screw. The lower connecting shaft passes through the lower connecting portion 121 of the lower damping connecting member 120 and the lower connecting member 133 to engage with a nut by screwing to fixedly connect the lower damping connecting member 120 to the lower connecting member 133 of the steel wire rope damper 130.

A manner in which the steel wire rope 135 is configured may be designed in accordance with different demands. For example, in one embodiment therein, there are a plurality of steel wire ropes 135, and two ends of each of the steel wire ropes 135 are fixedly connected with the upper connecting member 131 and the lower connecting member 133 respectively.

In another embodiment, there are a plurality of steel wire ropes 135, and each of the steel wire ropes 135 is wound around the upper connecting member 131 and the lower connecting member 133.

In another embodiment, there is one steel wire rope 135. The steel wire rope 135 is wound around the upper connecting member 131 and the lower connecting member 133 such that a plurality of elastic portions of the steel wire rope 135 are exposed between the upper connecting member 131 and the lower connecting member 133.

A manner in which elastic portions of a steel wire rope 135 are distributed may be designed in accordance with different demands. For example, in the embodiment illustrated, a steel wire rope 135 has a plurality of elastic portions exposed between the upper connecting member 131 and the lower connecting member 133. The elastic portions are distributed, in central symmetry or axial symmetry, between the upper connecting member 131 and the lower connecting member 133.

Further, a carrying damper 140 connected with the upper damping connecting member 110 is further included. The carrying damper 140 includes at least one of the followings: a one-dimensional damper that damps vibration along a one-dimensional straight line, a two-dimensional damper that damps vibration in a two-dimensional plane, or a three-dimensional damper that damps vibration in a three-dimensional space.

Specifically, in the embodiment illustrated, the carrying damper 140 may be a one-dimensional damper that damps vibration along a one-dimensional straight line. There are a plurality of steel wire rope dampers 130 distributed on the same plane. A damping direction of the carrying damper 140 is perpendicular to the plane where the plurality of steel wire rope dampers 130 are located.

The specific structure of the carrying damper 140 may be designed in accordance with different demands. For example, as shown in FIGS. 2-7, in the embodiment illustrated, the carrying damper 140 includes a lower adaptor 141, an upper adaptor 143, and a damping elastic member 145. The lower adaptor 141 is fixedly connected with the upper damping connecting member 110. The upper adaptor 143 is opposite to and spaced apart from the lower adaptor 141 and is connected with the lower adaptor 141 through a pivot shaft 146. At least one of the lower adaptor 141 or the upper adaptor 143 is slidable along the pivot shaft 146. The damping elastic member 145 is disposed between the upper adaptor 143 and the lower adaptor 141, and is sleeved on the pivot shaft 146. The damping elastic member 145 is elastically deforms when the lower adaptor 141 slides relative to the upper adaptor 143.

Further, a plurality of steel wire rope dampers 130 are distributed in central symmetry. The pivot shaft 146 is perpendicular to the plane where the plurality of steel wire rope dampers 130 are located, and is disposed corresponding to a center of symmetry of the plurality of steel wire rope dampers 130.

The damping elastic member 145 may be an elastic rubber cushion, a compression spring, an elastic rubber barrel, a metal elastic piece, or the like. A manner in which the damping elastic member 145 is configured may be designed in accordance with different demands. For example, in the embodiment illustrated, a plurality of steel wire rope dampers 130 are distributed in central symmetry, and the damping elastic member 145 is disposed corresponding to a center of symmetry of the plurality of steel wire rope dampers 130.

The specific structure of the lower adaptor 141 may be designed in accordance with different demands. For example, as shown in FIG. 2, in the embodiment illustrated, the lower adaptor 141 includes an adaptor body 141a and a plurality of mounting legs 141b disposed at edges of the adaptor body 141a. The plurality of mounting legs 141b are inclined, relative to the adaptor body 141a, towards the upper connecting portions 111. The adaptor body 141a is provided with a mounting slot 141c, and the damping elastic member 145 is disposed in the mounting slot 141c. The upper adaptor 143 is disposed corresponding to the mounting slot 141c and abuts against the damping elastic member 145. The mounting legs 141b are detachably connected with the upper damping connecting member 110 through bolts.

The specific structure of the upper adaptor 143 may be designed in accordance with different demands. For example, in the embodiment illustrated, the damping device 100 further includes a carrying connecting member 150. The upper adaptor 143 and the carrying connecting member 150 are detachably assembled to form a clamping ring.

When the carrying connecting member 150 is used to connect a vehicle-mounted hanging component 1000 being a rod-shaped component, for example, in the embodiment illustrated, the clamping ring jointly formed by the carrying connecting member 150 and the upper adaptor 143 of the carrying damper 140 is sleeved on the vehicle-mounted hanging component 1000 to fix the damping device 100 on the vehicle-mounted hanging component 1000. As shown in FIG. 1, specifically, the upper adaptor 143 and the carrying connecting member 150 are both semicircular and include two ends that are both provided with through holes. With a rope 151 or other components passing through the through holes at the two ends of the upper adaptor 143 and the carrying connecting member 150, the upper adaptor 143 and the carrying connecting member 150 are detachably connected.

The specific structure of the carrying damper 140 may also be a different structure. For example, the carrying damper 140 includes a lower adaptor 141, an upper adaptor 143, and a damping elastic member 145. The lower adaptor 141 is fixedly connected with the upper damping connecting member 110. The upper adaptor 143 is opposite to and spaced apart from the lower adaptor 141. The damping elastic member 145 is disposed between the upper adaptor 143 and the lower adaptor 141, and is fixedly connected with the upper adaptor 143 and the lower adaptor 141. Here, the carrying damper 140 may be a two-dimensional damper that damps vibration in a two-dimensional plane, or a three-dimensional damper that damps vibration in a three-dimensional space.

Figure 8:
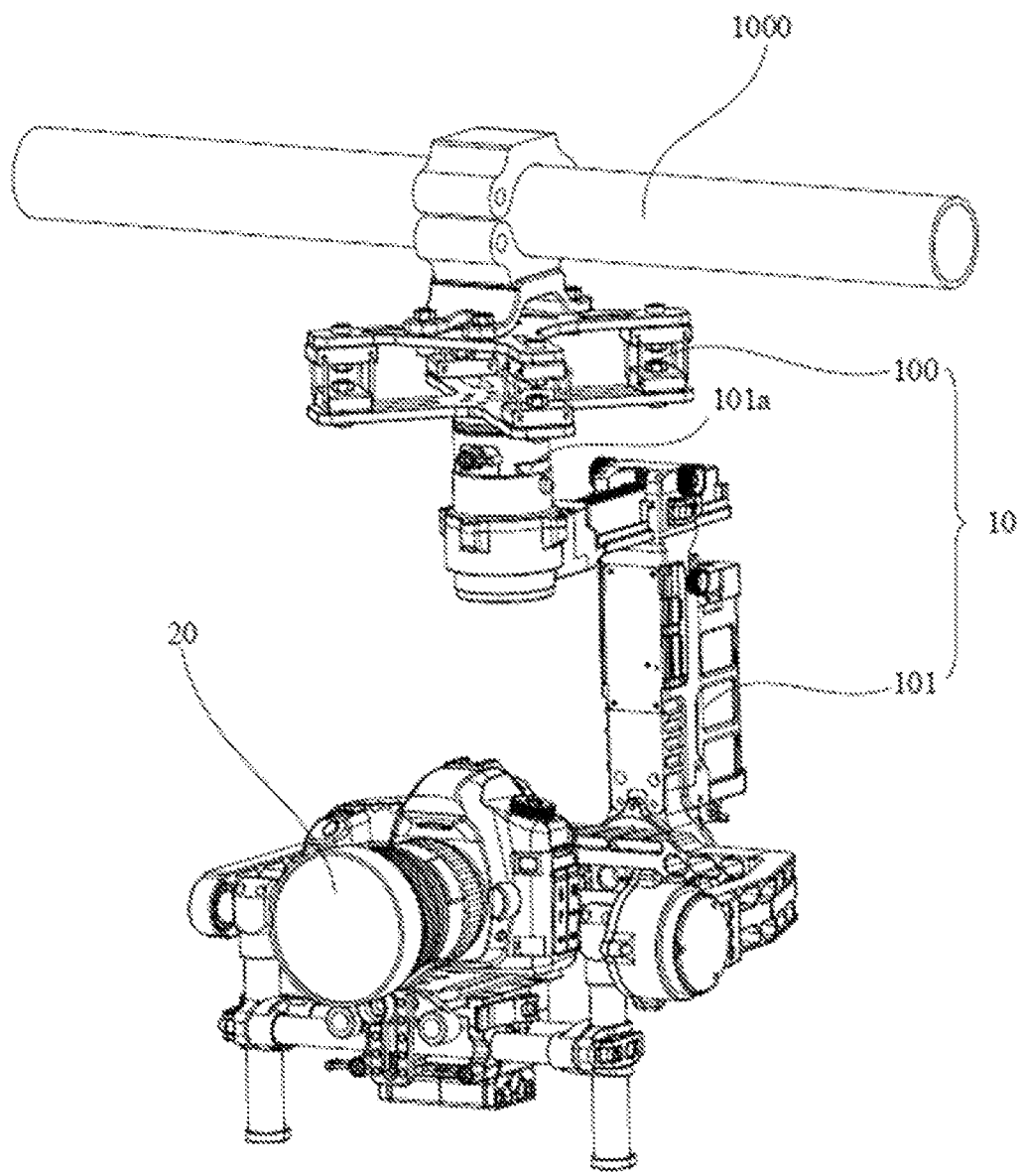
FIG. 8 is a perspective view of a vehicle-mounted gimbal that uses the damping device shown in FIG. 1.

Further, as shown in FIG. 2 and FIG. 8, the damping device 100 further includes a gimbal connecting mechanism 160 fixedly connected to the lower damping connecting member 120 for detachably connecting a gimbal 101. Specifically, a plurality of steel wire rope dampers 130 are distributed in central symmetry, and the gimbal connecting mechanism 160 is disposed corresponding to a center of symmetry of the plurality of steel wire rope dampers 130.

The specific structure of the gimbal connecting mechanism 160 may be designed in accordance with different demands. For example, in the embodiment illustrated, the gimbal connecting mechanism 160 includes an adaptor base 161, a locking block 163, and a limiting member 165. The adaptor base 161 is provided with a dovetail-shaped slide slot 161a and a guide slot 161b penetrating a side wall of the slide slot 161a. The locking block 163 is mounted in the guide slot 161b of the adaptor base 161, and is slidable along the guide slot 161b. The limiting member 165 is used to limit the locking block 163. The slide slot 161a is used to receive a dovetail-shaped sliding portion 101a of the gimbal 101. The locking block 163 can slide into the slide slot 161a from the guide slot 161b to snap in the sliding portion 101a. The limiting member 165 limits the locking block 163 to prevent the locking block 163 from sliding.

The specific structure of the limiting member 165 may be designed in accordance with different demands. For example, in the embodiment illustrated, the limiting member 165 includes a threaded connecting member 165a and an adjusting knob 165b. The threaded connecting member 165a passes through the locking block 163 and is fixedly connected with the adaptor base 161. The adjusting knob 165b is sleeved on the threaded connecting member 165a and engaged with the threaded connecting member 165a by screwing. When the adjusting knob 165b is rotated, the adjusting knob 165b moves on the threaded connecting member 165a to compress the locking block 163.

In other embodiments, the limiting member 165 includes an adjusting threaded member. The adaptor base 161 is provided with a threaded hole penetrating an inner wall of the guide slot 161b of the adaptor base 161. The adjusting threaded member passes through the threaded hole and engaged with the threaded hole by screwing. One end of the adjusting threaded member abuts against the locking block 163 received in the guide slot 161b to limit the locking block 163.

The specific structure of the gimbal connecting mechanism 160 may also be a different structure. For example, the gimbal connecting mechanism 160 includes an adaptor base and a hanger. The adaptor base is provided with a mounting hole with a plurality of limiting bosses located on an inner wall of the mounting hole. The plurality of limiting bosses are arranged along a circumferential direction of the mounting hole of the adaptor base and are spaced apart. The hanger is provided with a hanging pillar and a plurality of hanging bosses located on sides of the hanging pillar. The plurality of hanging bosses are arranged along a circumferential direction of the hanging pillar, and disposed respectively corresponding to the plurality of limiting bosses. The hanging pillar, after the plurality of hanging bosses pass through gaps between the plurality of limiting bosses respectively, rotates by a predetermined angle to make the plurality of hanging bosses abut against the plurality of limiting bosses respectively, so as to hang the hanging pillar in the mounting hole of the adaptor base.

It should be noted that an effective load capacity of a steel wire rope damper 130 may be designed in accordance with the weight of a load hung by the damping device 100. For example, if an effective load of a single steel wire rope damper 130 is 2-4 kg, a load up to 10 kg can be easily operated.

Based on the aforementioned damping device 100, the present disclosure further provides a vehicle-mounted gimbal 10 using the damping device 100.

Referring to FIG. 2 and FIG. 8, the vehicle-mounted gimbal 10 according to an implementation manner of the present disclosure includes a damping device 100 and a gimbal 101. The gimbal 101 is fixedly connected with the lower damping connecting member 120. The upper damping connecting member 110 is used to be connected with a vehicle-mounted hanging component 1000 such that the gimbal 101 is mounted on the vehicle-mounted hanging component 1000 through the damping device 100.

The vehicle-mounted gimbal 10 can hang a load 20. For example, the load 20 hung may be a camera, a vehicle-mounted speedometer, or the like.

Compared with the traditional damping technology, the aforementioned damping device 100 at least has the following advantages:

(1) The aforementioned damping device 100 is connected between the upper damping connecting member 110 and the lower damping connecting member 120 using a steel wire rope damper 130. The steel wire rope damper 130 has characteristics of nonlinear stiffness and nonlinear damping, and has advantages such as strong environment adaptability, a long service life, diversified mounting manners, good buffering and anti-shock performance, great damping, and convenient mounting. The aforementioned damping device 100 exhibits good performance in different vibration situations to effectively mitigating influences brought about to the gimbal 101 by external vibration, thus reducing a vibration frequency to achieve a better damping effect.

Figure 9:
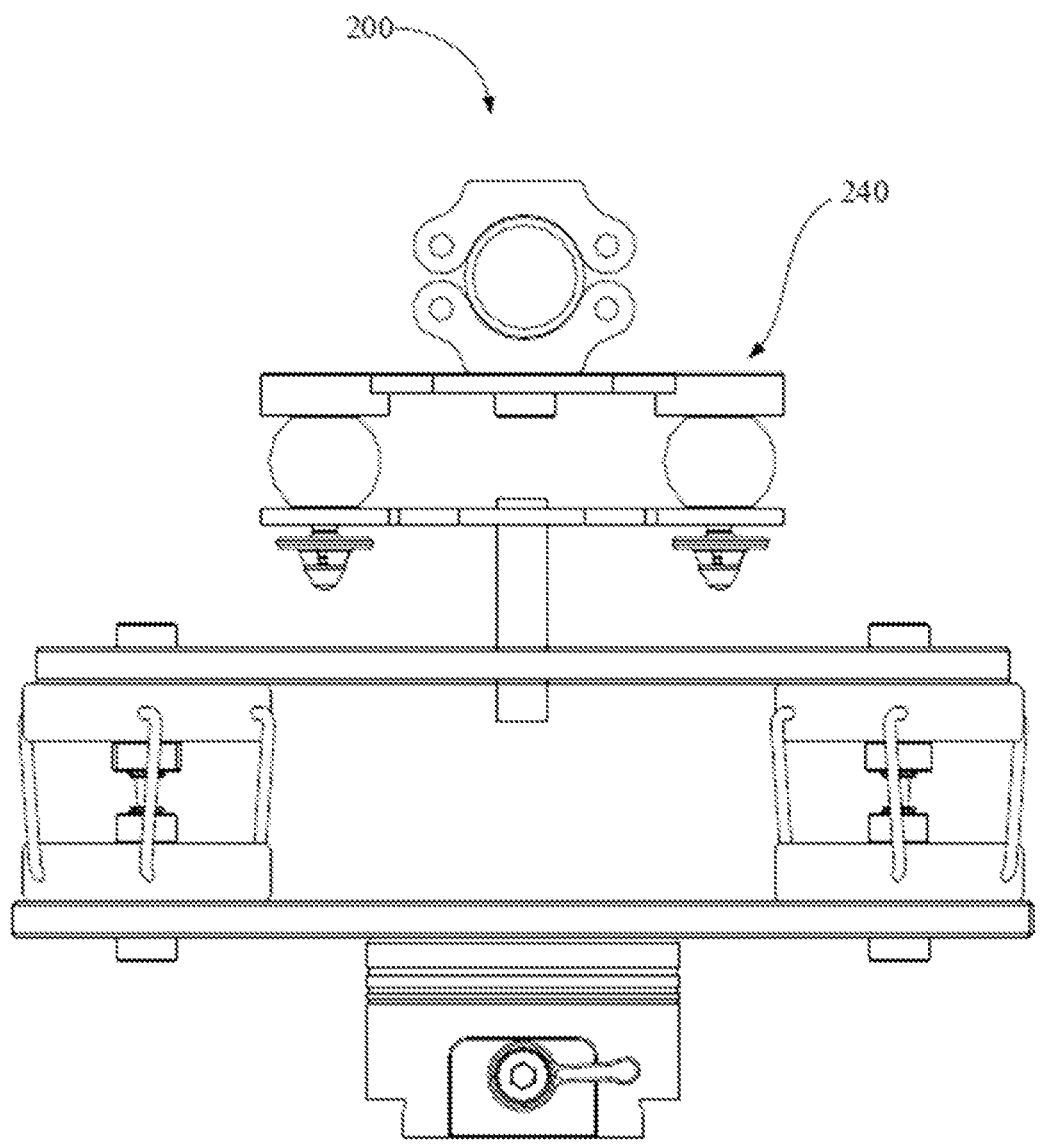
FIG. 9 is a side view of a damping device according to a second implementation manner of the present disclosure.

Referring to FIG. 9, a damping device 200 according to a second implementation manner of the present disclosure is basically similar to the damping device 100 according to the first implementation manner. Their difference lies in that a carrying damper 240 of the damping device 200 according to the second implementation manner is an elastic ball damper.

Figure 10:
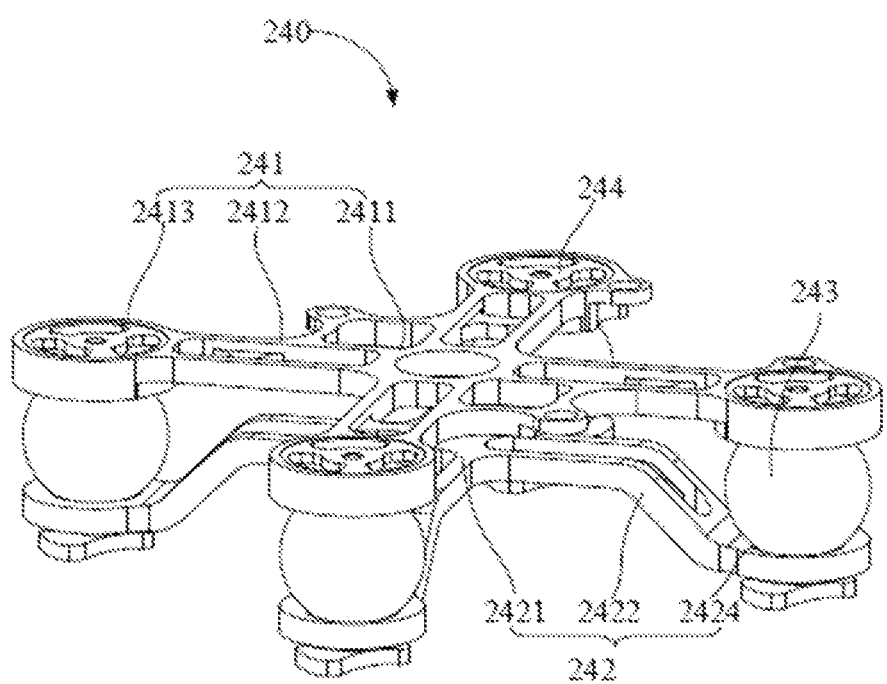
FIG. 10 is a perspective view of a carrying damper of the damping device shown in FIG. 9.
Figure 11:
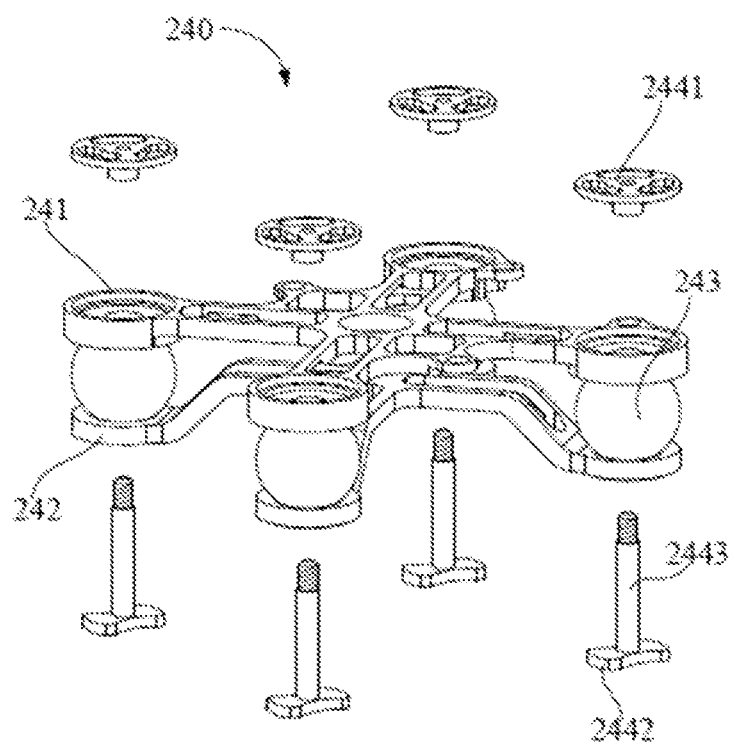
FIG. 11 is an exploded view of a carrying damper of the damping device shown in FIG. 9.
Figure 12:
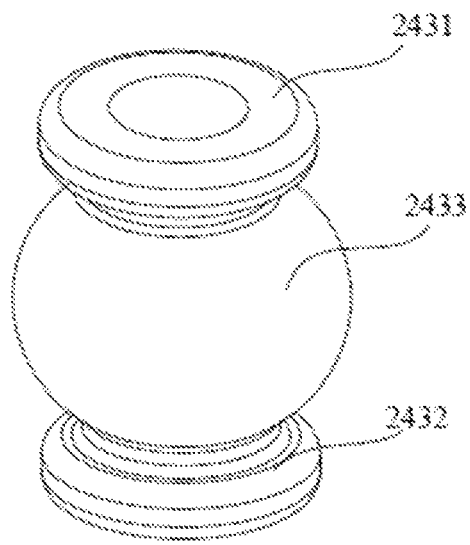
FIG. 12 is a perspective view of a damping elastic member of the carrying damper of the damping device shown in FIG. 10.

Referring to FIG. 10 to FIG. 12, specifically, in the embodiment illustrated, the carrying damper 240 includes a base 241, a mounting seat 242, and at least one damping elastic member 243. The mounting seat 242 is spaced apart from the base 241 at a preset distance. The damping elastic member 243 connects the base 241 and the mounting seat 242. The damping elastic member 243 is a hollow elastic ball. The damping elastic member 243 has one end connected with the base 241 and the other end connected with the mounting seat 242.

The base 241 includes a bottom plate 2411 and a plurality of bottom arms 2412 that scatter and extend from the bottom plate 2411. The bottom arms 2412 are provided thereon with first receiving slots 2413 penetrating the bottom arms 2412.

The mounting seat 242 and the base 241 are spaced apart by at least one damping member 243. The mounting seat 242 includes a mounting plate 2421 and a plurality of mounting arms 2422 that scatter and extend from the mounting plate 2421. The mounting arms 2422 are provided thereon with second receiving slots 2424 penetrating the mounting arms 2422.

In the implementation manner, the number of the bottom arms 2412 and the number of the mounting arms 2422 are both four, and the base 241 and the mounting seat 242 each have an approximately crisscross shape. The number of the bottom arms 2412, the number of the first receiving slots 2413, the number of the mounting arms 2422, and the number of the second receiving slots 2424 are all correspondingly set to four, and the number of the damping elastic members 243 fitted to the bottom arms 2412 and the mounting arms 2422 is also set to four. Any damping elastic member 243 has one end connected to the bottom arms 2412 of the base 241 and the other end connected to the corresponding mounting arms 2422 of the mounting seat 242.

Any damping elastic member 243 is hollow, which includes a first connecting portion 2431 received in a first receiving slot 2413 of the base 241, a second connecting portion 2432 received in a second receiving slot 2424 of the mounting seat 242, and a damping portion 2433 connecting the first connecting portion 2431 and the second connecting portion 2432. In order to provide a better damping effect, the damping elastic member 243 is made of an elastic material such as rubber, silicone, sponge, or spring. In order to achieve a better damping effect, the damping portion 2433 is configured to be ball-shaped.

In operation, the mounting seat 242, in a manner of stretching the damping elastic member 243, reduces unnecessary vibration produced by the base 241 for the load attached to the mounting seat 242. The first connecting portion 2431 and the second connecting portion 2432 are respectively movably received in the first receiving slot 2413 and the second receiving slot 2424. When the mounting seat 242 stretches the damping elastic member 243, the damping elastic member 243 is prone to drop from the mounting seat 242 and/or the base 241. In order to solve the aforementioned problem, the damping device 200 is further provided with four anti-drop members 244 used to prevent the damping elastic members 243 from dropping from the base 241 and/or the mounting seat 242.

Figure 13:
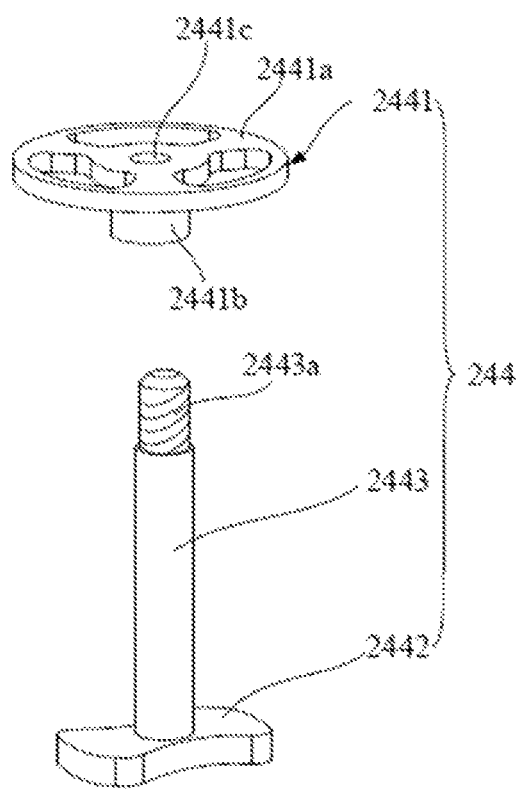
FIG. 13 is an exploded view of a first embodiment of an anti-drop member of the carrying damper of the damping device shown in FIG. 10.

In combination with illustration in FIG. 13, FIG. 13 is an exploded view of an anti-drop member 244 according to the first implementation manner. The anti-drop member 244 includes a first abutment portion 2441 used to abut against the base 241, a second abutment portion 2442 spaced apart from the first abutment portion 2441 by a certain distance and used to abut against the mounting seat 242, and a supporting portion 2443 connecting the first abutment portion 2441 and the second abutment portion 2442 and penetrating the damping elastic member 243. The supporting portion 2443 sequentially penetrates the first receiving slots 2413 of the base 241, the first connecting portion 2431 of the damping elastic member 243, the damping portion 2433 and the second connecting portion 2432 of the damping elastic member 243, and the second receiving slots 2424 of the mounting seat 242 respectively. The first abutment portion 2441 is used to abut against an outer surface of the base 241 away from the mounting seat 242. The second abutment portion 2442 is used to abut against an outer surface of the mounting seat 242 away from the base 241.

In the implementation manner, the second abutment portion 2442 is integrally configured with the supporting portion 2443. The first abutment portion 2441 may be fixedly connected with the supporting portion 2443 by threading or riveting to facilitate assembly and disassembly of the damping device 200. Specifically, the first abutment portion 2441 includes a first abutment plate 2441a used to abut against the base 241, a fixing portion 2441b extending from the first abutment plate 2441a towards the mounting seat 242, and a fixing hole 2441c penetrating both the first abutment plate 2441a and the fixing portion 2441b. In the implementation manner, one end of the supporting portion 2443 away from the second abutment portion 2442 is provided with an external thread 3443a, and the fixing hole 2441c is internally provided with an internal thread. The supporting portion 2443 is connected to the first abutment portion 2441 by engaging the external thread 3443a with the internal thread of the fixing hole 2441c. The fixing portion 2441b can be certainly omitted by directly connecting the fixing hole 2441c to the first abutment plate 2441a.

In an optional implementation manner, the first abutment portion 2441, the second abutment portion 2442, and the supporting portion 2443 are configured separately, and in assembly, the first abutment portion 2441 and the second abutment portion 2442 are fixedly connected with the supporting portion 2443 respectively by a technology well known in the art such as threading or riveting.

Figure 14:
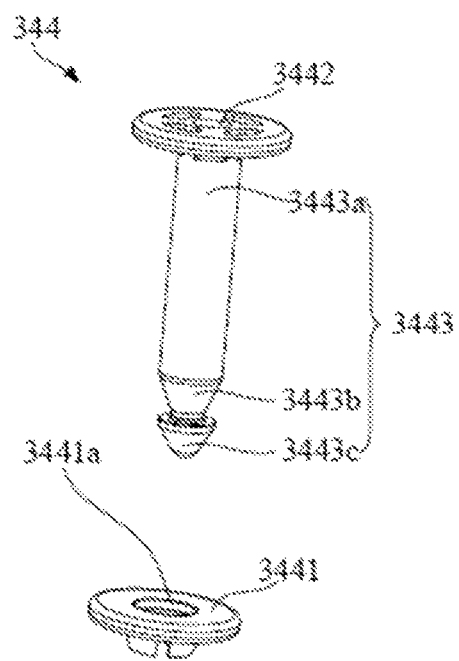
FIG. 14 is an exploded view of a second embodiment of an anti-drop member of the carrying damper of the damping device shown in FIG. 10.

Referring to FIG. 14, it is a second implementation manner of an anti-drop member 344. The anti-drop member 344 according to the second implementation manner is similar to the anti-drop member 244 according to the first implementation manner, and their differences are as follows:

A supporting portion 3443 includes a first extending portion 3443a connected with a second abutment portion 3442, a second extending portion 3443b extending away from the second abutment portion 3442 from the first extending portion 3443a, and a third extending portion 3443c extending away from the first extending portion 3443a from the second extending portion 3443b. The second extending portion 3443b is located between the first extending portion 3443a and the third extending portion 3443c. Projection of the second extending portion 3443b along a direction of extension of the supporting portion 3443 falls within the third extending portion 3443c. Projection of the second extending portion 3443b along a direction away from the extension of the supporting portion 3443 falls within the first extending portion 3443a such that a first abutment portion 3441 is sleeved on the second extending portion 3443b through a fixing hole 3441a. The first abutment portion 3441 is engaged between the first extending portion 3443a and the third extending portion 3443c such that the first abutment portion 3441 is not prone to drop from the supporting portion 3443. The second extending portion 3443b is in a cone shape, and in the direction from the first extending portion 3443a to the third extending portion 3443c, the cross section of the second extending portion 3443b is reduced. In order to facilitate assembly of the first abutment portion 3441, the third extending portion 3443c is also in a cone shape, and in the direction from the first extending portion 3443a to the third extending portion 3443c, the cross section of the third extending portion 3443c is reduced.

Figure 15:
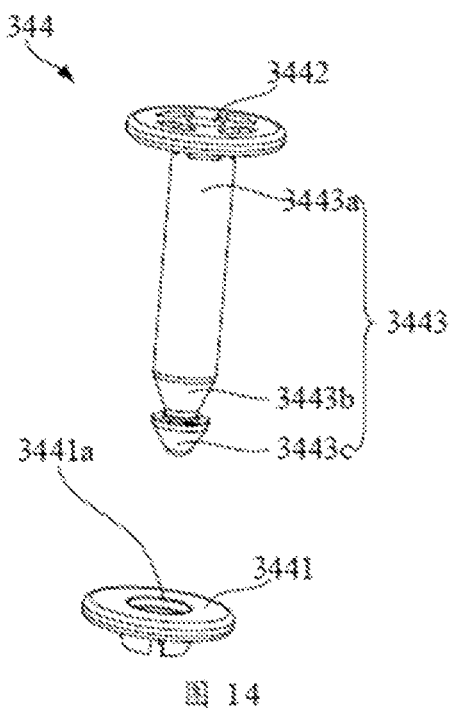
FIG. 15 is an exploded view of a third embodiment of an anti-drop member of the carrying damper of the damping device shown in FIG. 10.
Figure 15:
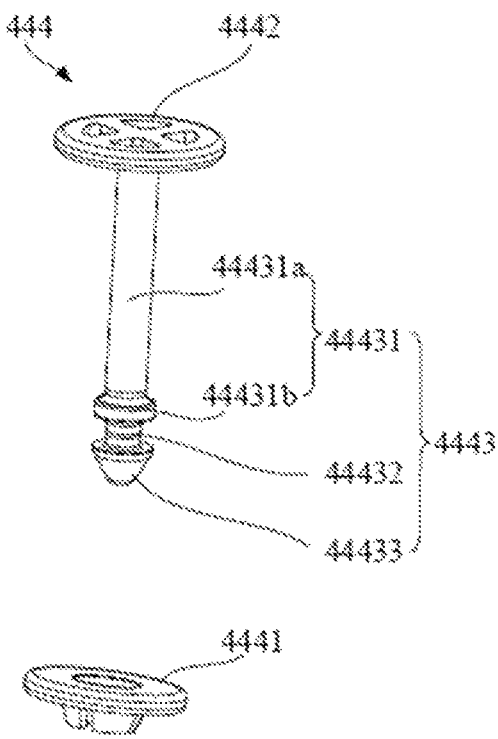

Referring to FIG. 15, FIG. 15 is an exploded view of an anti-drop member 444 according to a third implementation manner. The anti-drop member 444 according to the third implementation manner is basically similar to the anti-drop member 344 according to the second implementation manner, and their differences are as follows:

A first abutment portion 4441 is sleeved on a columnar, second extending portion 44432. A first extending portion 44431 of a supporting portion 4443 is provided with a continuation portion 44431a connected with a second abutment portion 4442 and an engagement portion 44431b partially connected with the continuation portion 44431a and the second extending portion 44432. In order to reduce the weight of the anti-drop member 444, projection of the second extending portion 44432 along a direction away from extension of the supporting portion 4443 falls within the engagement portion 44431b. Projection of the continuation portion 44431a along a direction of the extension of the supporting portion 4443 also falls within the engagement portion 44431b.

In other optional implementation manners, the anti-drop member 244 may not penetrate the base 241, the damping elastic member 243 and the mounting seat 242. For example, the anti-drop member 244 has flexibility and is directly wound around the bottom arms 2412 of the base 241 and the mounting arms 2422 of the mounting seat 242. In some embodiments, the anti-drop member 244 is in a shape of a strip or rope. The anti-drop member 244 has flexibility and, on the premise of not affecting the effect of the damping elastic member 243, may also achieve an effect of preventing the damping elastic member 243 from dropping from the base 241 and/or the mounting seat 242.

In addition, the first receiving slots 2413 and the second receiving slots 2424 may be omitted. The first connecting portion 2431 is directly connected with a surface of the base 241 close to the mounting seat 242. The second connecting portion 2432 is directly connected with a surface of the mounting seat 242 close to the base 241. The aforementioned implementation manner may also achieve a connection of the damping elastic member 243 with the base 241 and the mounting seat 242.

In order to enhance the damping effect, the first abutment portion 2441 movably abuts against an outer surface of the base 241 away from the mounting seat 242. In an optional implementation manner, the first abutment portion 2441 may also fixedly abut against the outer surface of the base 241 away from the mounting seat 242; or, the first abutment portion 2441 fixedly abuts against a surface of the base 241 close to the mounting seat 242.

In order to increase the amount of stretching of the damping elastic member 243, the supporting portion 2443 may also have a certain elasticity, as long as a binding force between the first abutment portion 2441, the second abutment portion 2442, and the supporting portion 2443 is greater than a stretching force of the damping elastic member 243.

In the implementation manner, the second abutment portion 2442 also movably abuts against an outer surface of the mounting seat 242 away from the base 241. In other optional implementation manners, the second abutment portion 2442 fixedly abuts against the mounting set 242. The second abutment portion 2442 may fixedly abut against an outer surface of the mounting arm 2422 of the mounting seat 242 away from the base 241; or, the second abutment portion 2442 may fixedly abut against an outer surface of the mounting arms 2422 of the mounting seat 242 close to the base 241. Here, the supporting portion 2443 has elasticity. By means of the elasticity of the supporting portion 2443, the damping effect of the damping elastic member 243 can be realized. By means of the binding force between the first abutment portion 2441, the supporting portion 2443, and the second abutment portion 2442, the amount of movement of the damping elastic member 243 is restricted, and the damping elastic member 243 is prevented from dropping from the base 241 and/or the mounting seat 242.

It should be noted that the carrying dampers 140 and 240 of the damping devices 100 and 200 in the aforementioned implementation manners may also be connected with a hanging component such as the vehicle-mounted hanging component 1000, and at this point, the steel wire rope dampers 130 are connected with the gimbal 101.

The aforementioned damping device 200 includes a carrying damper 240 and a steel wire rope damper, and the carrying damper 240 cooperates with the steel wire rope damper to carry out secondary damping, thereby further optimizing the damping effect.

Figure 16:
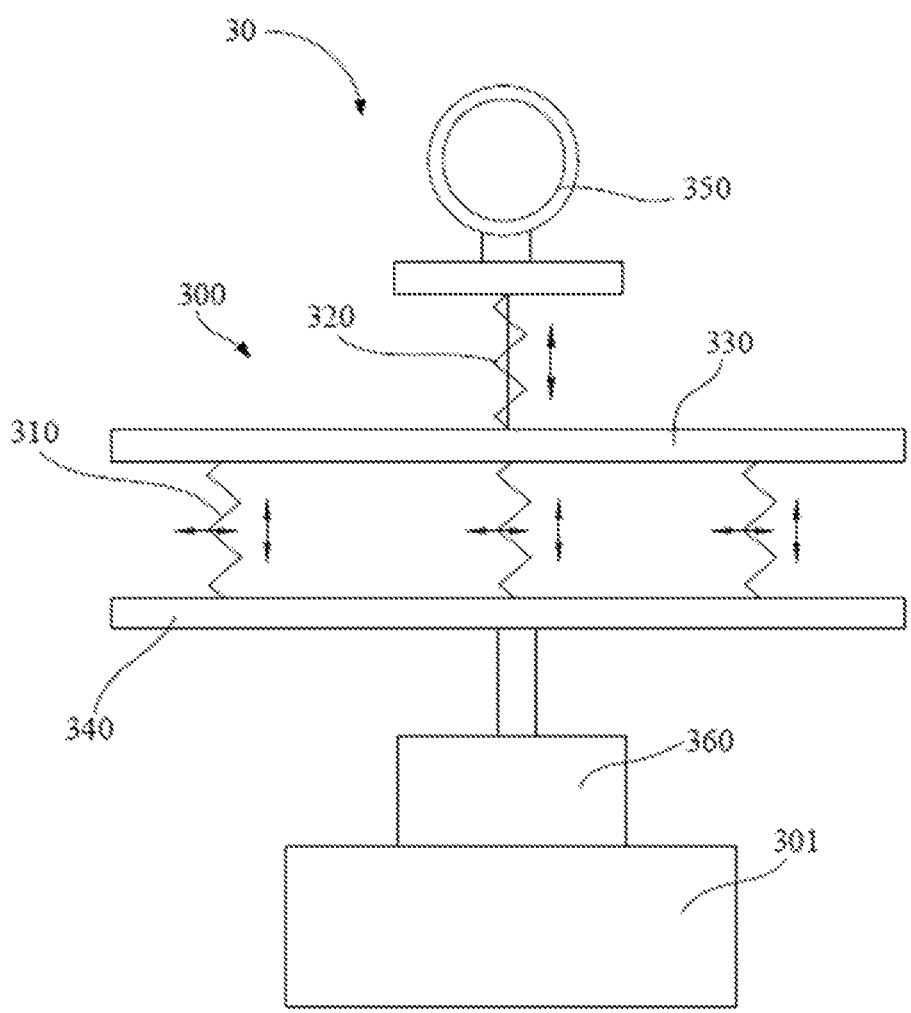
FIG. 16 is a side view of a damping device according to a third implementation manner of the present disclosure.

Referring to FIG. 16, a damping device 300 according to a third implementation manner of the present disclosure includes a gimbal damper 310 and a carrying damper 320. The gimbal damper 310 is used to be fixedly connected with a gimbal 301, and the gimbal damper 310 is a three-dimensional damper that damps vibration in a three-dimensional space. The carrying damper 320 is fixedly connected with the gimbal damper 310, and the carrying damper 320 is a one-dimensional damper that damps vibration along a one-dimensional straight line. External vibration is transferred from the carrying damper 320 to the gimbal damper 310, and then transferred to the gimbal 301 through the gimbal damper 310.

The specific structure of the gimbal damper 310 may be designed in accordance with different demands. For example, the gimbal damper 310 may be a steel wire rope damper, an elastic ball damper, a spring damper, a metal elastic piece damper, a rubber cushion damper and the like. The steel wire rope damper mainly uses a steel wire rope as a damping elastic member having, for example, the structure illustrated in the first implementation manner of the present disclosure. The elastic ball damper mainly uses an elastic ball, such as a hollow rubber ball, as a damping elastic member having, for example, the structure illustrated in the second implementation manner of the present disclosure. The spring damper mainly uses a spring as a damping elastic member. For example, the spring damper includes an upper connecting plate, a lower connecting plate and a plurality of compression springs. The lower connecting plate is opposite to and spaced apart from the upper connecting plate. The plurality of compression springs are disposed between the upper connecting plate and the lower connecting plate, and two ends of each compression spring are fixedly connected with the upper connecting plate and the lower connecting plate respectively. The metal elastic piece damper mainly uses a metal elastic piece as a damping elastic member. For example, the metal elastic piece damper includes an upper connecting plate, a lower connecting plate, and a plurality of metal elastic pieces. The lower connecting plate is opposite to and spaced apart from the upper connecting plate. The plurality of metal elastic pieces are disposed between the upper connecting plate and the lower connecting plate, and two ends of each metal elastic piece are fixedly connected with the upper connecting plate and the lower connecting plate respectively, wherein the middle portion of each metal elastic piece is provided with at least one "Z" type bending portion. The rubber cushion damper mainly uses an elastic rubber cushion as a damping elastic member. For example, the rubber cushion damper includes an upper connecting plate, a lower connecting plate, and an elastic rubber cushion. The lower connecting plate is opposite to and spaced apart from the upper connecting plate, and the elastic rubber cushion is clamped between the upper connecting plate and the lower connecting plate.

The number of the gimbal damper 310 is designed in accordance with different demands. For example, there may be a plurality of gimbal dampers 310, and the plurality of gimbal dampers 310 are arranged on the same plane.

The specific structure of the carrying damper 320 may be designed in accordance with different demands. For example, the carrying damper 320 may be a steel wire rope damper, an elastic ball damper, a spring damper, a metal elastic piece damper, a rubber cushion damper and the like. The steel wire rope damper mainly uses a steel wire rope as a damping elastic member. For example, a connecting pivot shaft is added to the structure illustrated in the first implementation manner such that the steel wire rope of the steel wire rope damper can only deform along the connecting pivot shaft. The elastic ball damper mainly uses an elastic ball, such as a hollow rubber ball, as a damping elastic member. For example, a connecting pivot shaft is added to the structure illustrated in the second implementation manner such that the elastic ball can only deform along the connecting pivot shaft. The spring damper mainly uses a spring as a damping elastic member. For example, the spring damper includes an upper connecting plate, a lower connecting plate, and a plurality of compression springs. The lower connecting plate and the upper connecting plate are opposite to and spaced apart from each other and are connected through a connecting pivot shaft, and at least one of the lower connecting plate and the upper connecting plate is slidable along the connecting pivot shaft without wobbling. The plurality of compression springs are disposed between the upper connecting plate and the lower connecting plate, and two ends of each compression spring are fixedly connected with the upper connecting plate and the lower connecting plate respectively. The metal elastic piece damper mainly uses a metal elastic piece as a damping elastic member. For example, the metal elastic piece damper includes an upper connecting plate, a lower connecting plate, and a plurality of metal elastic pieces. The lower connecting plate and the upper connecting plate are opposite to and spaced apart from each other and are connected through a connecting pivot shaft, and at least one of the lower connecting plate and the upper connecting plate is slidable along the connecting pivot shaft without wobbling. The plurality of metal elastic pieces are disposed between the upper connecting plate and the lower connecting plate, and two ends of each metal elastic piece are fixedly connected with the upper connecting plate and the lower connecting plate respectively, wherein the middle portion of each metal elastic piece is provided with at least one "Z" type bending portion. The rubber cushion damper mainly uses an elastic rubber cushion as a damping elastic member. For example, the rubber cushion damper includes an upper connecting plate, a lower connecting plate, and an elastic rubber cushion. The lower connecting plate and the upper connecting plate are opposite to and spaced apart from each other and are connected through a connecting pivot shaft, and at least one of the lower connecting plate and the upper connecting plate is slidable along the connecting pivot shaft without wobbling. The elastic rubber cushion is clamped between the upper connecting plate and the lower connecting plate.

A manner in which the gimbal damper 310 and the carrying damper 320 are configured may be designed in accordance with different demands. For example, in one embodiment therein, a plurality of gimbal dampers 310 may be distributed in central symmetry. Here, the carrying damper 320 may be disposed corresponding to a center of symmetry of the plurality of gimbal dampers 310.

In another embodiment, the plurality of gimbal dampers 310 may be distributed in axial symmetry. Here, there may be a plurality of carrying dampers 320, and the carrying dampers 320 are arranged on an axis of symmetry of the plurality of gimbal dampers 310.

A damping direction of the gimbal damper 310 and a damping direction of the carrying damper 320 may be designed in accordance with different demands. For example, in the embodiment illustrated, a damping direction of the carrying damper 320 is perpendicular to a plane where the plurality of gimbal dampers 310 are located. Further, the damping direction of the carrying damper 320 is the same as one of the damping directions of the gimbal dampers 310. For example, the damping direction of the carrying damper 320 is the same as a damping direction of the gimbal dampers 310 perpendicular to the plane where the gimbal dampers 310 are located.

A manner in which the gimbal damper 310 is connected with the carrying damper 320 may be designed in accordance with different demands. For example, in the embodiment illustrated, the damping device 300 further includes an upper damping connecting member 330, a lower damping connecting member 340, and a carrying connecting member 350. The upper damping connecting member 330 is opposite to and spaced apart from the lower damping connecting member 340. A plurality of gimbal dampers 310 are disposed between the upper damping connecting member 330 and the lower damping connecting member 340, and two ends of each gimbal damper 310 are connected with the upper damping connecting member 330 and the lower damping connecting member 340 respectively. The carrying connecting member 350 is a carrying connecting member 350 used to detachably connect an external carrying component. The carrying connecting member 350 is opposite to and spaced apart from the upper damping connecting member 330, and two ends of the carrying damper 320 are fixedly connected with the carrying connecting member 350 and the upper damping connecting member 330 respectively.

The specific structures of the upper damping connecting member 330 and the lower damping connecting member 340 may be designed in accordance with different demands. For example, they may be the structures illustrated in the aforementioned implementation manners.

The specific structure of the carrying connecting member 350 may also be designed in accordance with different demands. For example, the carrying connecting member 350 may be a clamping ring, a rope, a hook, a snap-fitting structure, a threaded connecting member or the like.

Further, the damping device 300 further includes a gimbal connecting mechanism 360 used to detachably connect with the gimbal 301.

A position to which the gimbal connecting mechanism 360 is configured may be designed in accordance with the position of the gimbal damper 310. For example, in the embodiment illustrated, a plurality of gimbal dampers 310 are distributed in central symmetry, and the gimbal connecting mechanism 360 is disposed corresponding to a center of symmetry of the plurality of gimbal dampers 310.

The specific structure of the gimbal connecting mechanism 360 may also be designed in accordance with actual demands. For example, it may be any of the structures illustrated in the aforementioned implementation manners.

Based on the aforementioned damping device 300, the present disclosure further provides a vehicle-mounted gimbal 30 using the damping device 300. The vehicle-mounted gimbal 30 includes the damping device 300 and a gimbal 301 fixedly connected with a damper 310 of the gimbal 301. The carrying damper 320 is connected with a vehicle-mounted hanging component such that the gimbal 301 can be mounted on the vehicle-mounted hanging component through the damping device 300.

Compared with the traditional damping technology, the aforementioned damping device 300 at least has the following advantages:

(1) The aforementioned damping device 300 is a composite damper, and as the composite damper includes a one-dimensional damper and a three-dimensional damper for damping vibration jointly, wherein the one-dimensional damper concentrate on damping vibration in a direction in which the vibration is more intense, a better damping effect is produced, and the cost is relatively low.

(2) Damping centers of the one-dimensional damper and the three-dimensional damper of the damping device 300 are made coaxial to further increase the damping effect.

It should be noted that, in the event of no conflict, the aforementioned embodiments and features in the embodiments can be combined with each other.

The foregoing disclosure is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A vehicle-mounted gimbal system, comprising:
    a damping device comprising:
        a first damping connecting member;
        a second damping connecting member opposite to and spaced apart from the first damping connecting member; and
        a steel wire rope damper, two ends of the steel wire rope damper being connected with the first damping connecting member and the second damping connecting member, respectively; and
    a gimbal configured to be mounted on a hanging component of a vehicle through the damping device.

2. The system according to claim 1, wherein the steel wire rope damper is a three-dimensional damper that damps vibrations in a three-dimensional space.

3. The system according to claim 1, wherein the steel wire rope damper comprises:
    a first connecting member fixedly connected with the first damping connecting member;
    a second connecting member fixedly connected with the second damping connecting member and arranged opposite to and spaced apart from the first connecting member; and
    a steel wire rope connecting the first connecting member and the second connecting member.

4. The system according to claim 3, wherein:
    the steel wire rope is wound around the first connecting member and the second connecting member, and the steel wire rope includes a plurality of elastic portions exposed between the first connecting member and the second connecting member.

5. The system according to claim 3, wherein the steel wire rope is a first steel wire rope, and the steel wire rope damper further includes a second steel wire rope, wherein:
    two ends of each of the first steel wire rope and the second steel wire rope are fixedly connected with the first connecting member and the second connecting member, respectively, or
    each of the first steel wire rope and the second steel wire rope is wound around the first connecting member and the second connecting member.

6. The system according to claim 3, wherein the steel wire rope includes a plurality of elastic portions exposed between the first connecting member and the second connecting member, the elastic portions being distributed in central symmetry or axial symmetry between the first connecting member and the second connecting member.

7. The system according to claim 3, wherein the first damping connecting member comprises a plurality of connecting portions distributed in central symmetry or axial symmetry, at least one of the connecting portions being configured to connect the first damping connecting member with the steel wire rope damper.

8. The system according to claim 7, wherein:
    the first damping connecting member comprises a cross-shaped plate, and end portions of the plate form the connecting portions, or
    the first damping connecting member comprises a circular plate, and the connecting portions are evenly disposed at a peripheral edge of the plate, or
    the at least one of the connecting portions is fixedly connected with the steel wire rope damper through a connecting shaft, and the connecting shaft is disposed in parallel to elastic portions of the steel wire rope exposed between the first connecting member and the second connecting member.

9. The system according to claim 3, wherein the second damping connecting member comprises a plurality of connecting portions distributed in central symmetry or axial symmetry, at least one of the connecting portions being configured to connect the second damping connecting member with the steel wire rope damper.

10. The system according to claim 9, wherein:
    the second damping connecting member comprises a cross-shaped plate, and end portions of the plate form the connecting portions.

11. The system according to claim 9, wherein:
    the at least one of the connecting portions is fixedly connected with the steel wire rope damper through a connecting shaft, and the connecting shaft is disposed in parallel to elastic portions of the steel wire rope exposed between the first connecting member and the second connecting member.

12. The system according to claim 1, further comprising:
    a connecting mechanism configured to detachably connect a gimbal with the second damping connecting member.

13. The system according to claim 12, wherein the connecting mechanism comprises:
    an adaptor base including a dovetail-shaped slide slot and a guide slot penetrating a side wall of the slide slot;

a locking block mounted in the guide slot and slidable along the guide slot; and a limiting member configured to limit the locking block, wherein:

the slide slot is configured to receive a dovetail-shaped sliding portion of the gimbal, the locking block is configured to slide into the slide slot from the guide slot to snap in the sliding portion, and the limiting member is configured to limit the locking block to prevent the locking block from sliding.

14. The system according to claim 13, wherein the limiting member comprises:

a threaded connecting member passing through the locking block and fixedly connected with the adaptor base; and an adjusting knob sleeved on the threaded connecting member and engaged with the threaded connecting member by screwing, wherein the adjusting knob is configured to move on the threaded connecting member when rotated, to compress the locking block.

15. The system according to claim 13, wherein:

the limiting member comprises an adjusting threaded member;

the adaptor base comprises a threaded hole penetrating an inner wall of the guide slot; and the adjusting threaded member passes through the threaded hole and is engaged with the threaded hole by screwing.

16. The system according to claim 15, wherein one end of the adjusting threaded member abuts against the locking block received in the guide slot to limit the locking block.

17. The system according to claim 12, wherein the connecting mechanism comprises:

an adaptor base including a mounting hole and a plurality of limiting bosses located on inner walls of the mounting hole, the plurality of limiting bosses being spaced apart along a circumferential direction of the mounting hole; and a hanger including a hanging pillar and a plurality of hanging bosses located on sides of the hanging pillar, the plurality of hanging bosses being arranged along a circumferential direction of the hanging pillar and disposed corresponding to the plurality of limiting bosses, respectively, wherein the hanging pillar is configured to rotate by a predetermined angle after the plurality of hanging bosses pass through gaps between the plurality of limiting bosses, respectively, to cause the plurality of hanging bosses abut against the plurality of limiting bosses, respectively, so as to hang the hanging pillar in the mounting hole.

18. The system according to claim 1, wherein the damping device is configured to transfer a vibration produced by the vehicle from the hanging component to the gimbal.

19. A vehicle, comprising:

the vehicle-mounted gimbal system according to claim 1; and a load mounted on the gimbal.

20. The vehicle according to claim 19, wherein the load is a camera, or a vehicle-mounted speedometer.

* * * * *